US012726219B2

(12) United States Patent
Chen et al.

(10) Patent No.: US 12,726,219 B2
(45) Date of Patent: Sep. 1, 2026

(54) RADIO FREQUENCY TRANSMISSION DEVICE AND MAGNETIC RESONANCE SYSTEM

(71) Applicant: SHANGHAI UNITED IMAGING HEALTHCARE CO., LTD., Shanghai (CN)

(72) Inventors: Jifeng Chen, Shanghai (CN); Xu Chu, Shanghai (CN); Bin Cao, Shanghai (CN); Hui Zhu, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 709 days.

(21) Appl. No.: 17/822,765

(22) Filed: Aug. 26, 2022

(65) Prior Publication Data

US 2023/0061226 A1 Mar. 2, 2023

(30) Foreign Application Priority Data

Aug. 27, 2021 (CN) ......................... 202110994734.6

(51) Int. Cl.
*H04B 1/04* (2006.01)
*H04B 1/16* (2006.01)

(52) U.S. Cl.
CPC ......... *H04B 1/0458* (2013.01); *H04B 1/0483* (2013.01); *H04B 1/1607* (2013.01)

(58) Field of Classification Search
CPC .. H04B 1/0458; H04B 1/0483; H04B 1/1607; G01R 33/3628; G01R 33/3614; G01R 33/3664; G01R 33/3621
See application file for complete search history.

(56) References Cited

U.S. PATENT DOCUMENTS

| | | | | |
|---|---|---|---|---|
| 4,827,219 | A | 5/1989 | Harrison | |
| 7,378,844 | B2 * | 5/2008 | Watkins | G01R 33/283 324/318 |
| 8,193,812 | B2 * | 6/2012 | Pinkerton | G01R 33/34046 324/318 |
| 9,606,204 | B2 * | 3/2017 | Qiu | G01R 33/3621 |
| 10,895,615 | B2 * | 1/2021 | Wynn | G01R 33/3685 |
| 2008/0136418 | A1 * | 6/2008 | Renz | G01R 33/422 324/322 |

(Continued)

FOREIGN PATENT DOCUMENTS

EP 3236558 A1 * 10/2017 ............. H02J 50/12

OTHER PUBLICATIONS

Stephan Orzada et al., A 32-channel Parallel Transmit System Add-on for 7T MRI, PLOS ONE, 14(9): 1-20, 2019.

(Continued)

*Primary Examiner* — Julio R Perez
(74) *Attorney, Agent, or Firm* — METIS IP LLC

(57) ABSTRACT

The present disclosure may provide a radio frequency transmission device. The radio frequency transmission device may include: a radio frequency power amplifier (RFPA) configured to produce a radio frequency signal; and a transmitter coil status selection module configured to transmit the radio frequency signal to at least one of a plurality of radio frequency coils. The RFPA and the transmitter coil status selection module may be housed in a device chamber.

17 Claims, 6 Drawing Sheets

(56) References Cited

U.S. PATENT DOCUMENTS

| | | | | |
|---|---|---|---|---|
| 2011/0254551 | A1* | 10/2011 | Leussler | G01R 33/3856 324/318 |
| 2012/0169335 | A1 | 7/2012 | Leussler | |
| 2013/0285659 | A1* | 10/2013 | Sohn | G01R 33/3456 324/322 |
| 2014/0139218 | A1 | 5/2014 | Findeklee et al. | |
| 2015/0177343 | A1* | 6/2015 | Wald | G01R 33/28 324/309 |
| 2019/0036496 | A1* | 1/2019 | Leussler | H03F 1/565 |
| 2020/0003856 | A1* | 1/2020 | Constable | G01R 33/3808 |
| 2023/0061226 | A1* | 3/2023 | Chen | G01R 33/3628 |
| 2024/0004010 | A1* | 1/2024 | Dietz | G01R 33/3852 |

OTHER PUBLICATIONS

The Extended European Search Report in European Application No. 22192400.4 mailed on Jan. 24, 2023, 10 pages.

First Office Action in Chinese Application No. 202110994734.6 mailed on Mar. 29, 2023, 17 pages.

The Communication Pursuant to Article 94(3) EPC in European Application No. 22192400.4 mailed on Feb. 4, 2025, 7 pages.

"Impedance matching-Wikipedia", Web page<https://en.wikipedia.org/w/index.php?title=Impedance_matching&oldid=974977039>, Aug. 26, 2020.

* cited by examiner

RADIO FREQUENCY TRANSMISSION DEVICE AND MAGNETIC RESONANCE SYSTEM

CROSS-REFERENCE TO RELATED APPLICATIONS

This application claims priority to Chinese Patent Application No. 202110994734.6, filed on Aug. 27, 2021, the contents of which are hereby incorporated by reference.

TECHNICAL FIELD

The present disclosure generally relates to magnetic resonance (MR), and more particularly, relates to a radio frequency (RF) transmission device and an MR system thereof.

BACKGROUND

Radio frequency power amplifiers (RFPAs) are usually used to convert low-power radio-frequency signals into higher-power signals. Such devices are connected to transmitter status selection units (TSSU) to transmit the amplified signals to coils. However, due to potential interference, conventionally the RFPA and TSSU are housed in device containers positioned in different rooms, resulting in waste of resources and space.

The output impedance of an RFPA can affect the electrical characteristics such as the gain and/or the efficiency of a power circuit of the RFPA. In some cases, a circulator, which is often integrated into the RFPA, is used to stabilize the output impedance of the RFPA at a predetermined level (e.g., 50Ω), thereby optimizing the electrical characteristics of the RFPA. However, the circulator is usually made of a magnetic material and is conventionally believed to be unsuitable to be kept in an environment with a magnetic field, such as a room housing a magnetic resonance imaging (MRI) device. However, such separation also causes waste of resources and space.

Therefore, it would be desirable to provide designs of RFPA systems that can be compact and stable.

SUMMARY

According to some embodiments of the present disclosure, a radio frequency transmission device may be provided. The radio frequency transmission device may include: a radio frequency power amplifier (RFPA) configured to produce a radio frequency signal; and a transmitter coil status selection module configured to transmit the radio frequency signal to at least one of a plurality of radio frequency coils. The RFPA and the transmitter coil status selection module may be housed in a device chamber.

In some embodiments, the radio frequency transmission device may include an impedance matching module connected to and in between the RFPA and the transmitter coil status selection module. The impedance matching module may be configured to receive the radio frequency signal from the RFPA and transmit the radio frequency signal to the transmitter coil status selection module.

In some embodiments, the impedance matching module may be housed in the device chamber.

In some embodiments, the impedance matching module may include an L matching network, a PI matching network, a T matching network, or a multi-level matching network.

In some embodiments, the impedance matching module may include at least one inductor and at least one capacitor. An equivalent impedance produced by the at least one inductor and the at least one capacitor may match a load impedance of the radio frequency transmission device.

In some embodiments, one of the at least one capacitor may include a vacuum capacitor or a variable diode.

In some embodiments, each the at least one inductor and the at least one capacitor may have a switch. The impedance matching module may include a switch control sub-module configured to close or open at least one switch of the at least one inductor and the at least one capacitor based on the load impedance of the radio frequency transmission device.

In some embodiments, the switch may include a diode.

In some embodiments, the impedance matching module may include at least one adjustment sub-module. The at least one adjustment sub-module may be configured to adjust at least one capacitance of the at least one capacitor based on the load impedance of the radio frequency transmission device.

In some embodiments, the impedance matching module may include a first capacitor and a detuning sub-module including a second capacitor and an inductor. A first end of the detuning sub-module may be operably connected to an output end of the RFPA.

A second end of the detuning sub-module may be operably connected to the transmitter coil status selection module. A first end of the first capacitor may be operably connected to and in between the output end of the RFPA and the detuning sub-module. A second end of the first capacitor may be operably connected to ground.

In some embodiments, the impedance matching module may further include an adjustment sub-module operably connected to the detuning sub-module and the first capacitor. The adjustment sub-module may be configured to adjust at least one of a capacitance of the first capacitor or a capacitance of the second capacitor based on the load impedance of the radio frequency transmission device.

In some embodiments, the transmitter coil status selection module may include a plurality of switches operably connected to the plurality of coils. The transmitter coil status selection module may transmit the radio frequency signal to the at least one of the plurality of radio frequency coils by closing at least one of the plurality of switches corresponding to the at least one radio frequency coil.

In some embodiments, the radio frequency transmission device may include an interference reduction module housed in the device chamber. The interference reduction module may be configured to reduce electromagnetic interference between the RFPA and the transmitter coil status selection module.

In some embodiments, the radio frequency transmission device may be located in an environment with a magnetic field.

In some embodiments, the magnetic field may include at least one of a static magnetic field, a gradient field, or a radio frequency field.

According to some embodiments of the present disclosure, a radio frequency transmission device may be provided. The radio frequency transmission device may include a radio frequency power amplifier (RFPA), an impedance matching module, and a transmitter coil status selection module. The RFPA may be configured to produce a radio frequency signal. The impedance matching module may be configured to receive the radio frequency signal from the RFPA and transmit the radio frequency signal to the transmitter coil status selection module. The transmitter coil status selection module may be configured to transmit the radio frequency signal to at least one of a plurality of radio frequency coils. The RFPA, the impedance matching module, and the transmitter coil status selection module may be housed in a room.

In some embodiments, the impedance matching module may include an L matching network, a PI matching network, a T matching network, or a multi-level matching network.

In some embodiments, the impedance matching module may include at least one inductor and at least one capacitor. An equivalent impedance produced by the at least one inductor and the at least one capacitor may match a load impedance of the radio frequency transmission device.

In some embodiments, each the at least one inductor and the at least one capacitor may have a switch. The impedance matching module may include a switch control sub-module configured to close or open at least one switch of the at least one inductor and the at least one capacitor based on the load impedance of the radio frequency transmission device.

According to some embodiments of the present disclosure, a magnetic resonance (MR) system may be provided. The MR system may include a computing device, a magnetic resonance spectrometer, a gradient power amplifier, a magnet, and a radio frequency transmission device. The computing device may be operably connected to the magnetic resonance spectrometer. The magnetic resonance spectrometer may be operably connected to the radio frequency transmission device and the gradient power amplifier. The radio frequency transmission device may include: a radio frequency power amplifier (RFPA) configured to produce a radio frequency signal; and a transmitter coil status selection module configured to transmit the radio frequency signal to at least one of a plurality of radio frequency coils. The RFPA and the transmitter coil status selection module may be housed in a device chamber.

Additional features will be set forth in part in the description which follows, and in part will become apparent to those skilled in the art upon examination of the following and the accompanying drawings or may be learned by production or operation of the examples.

The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments.

These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
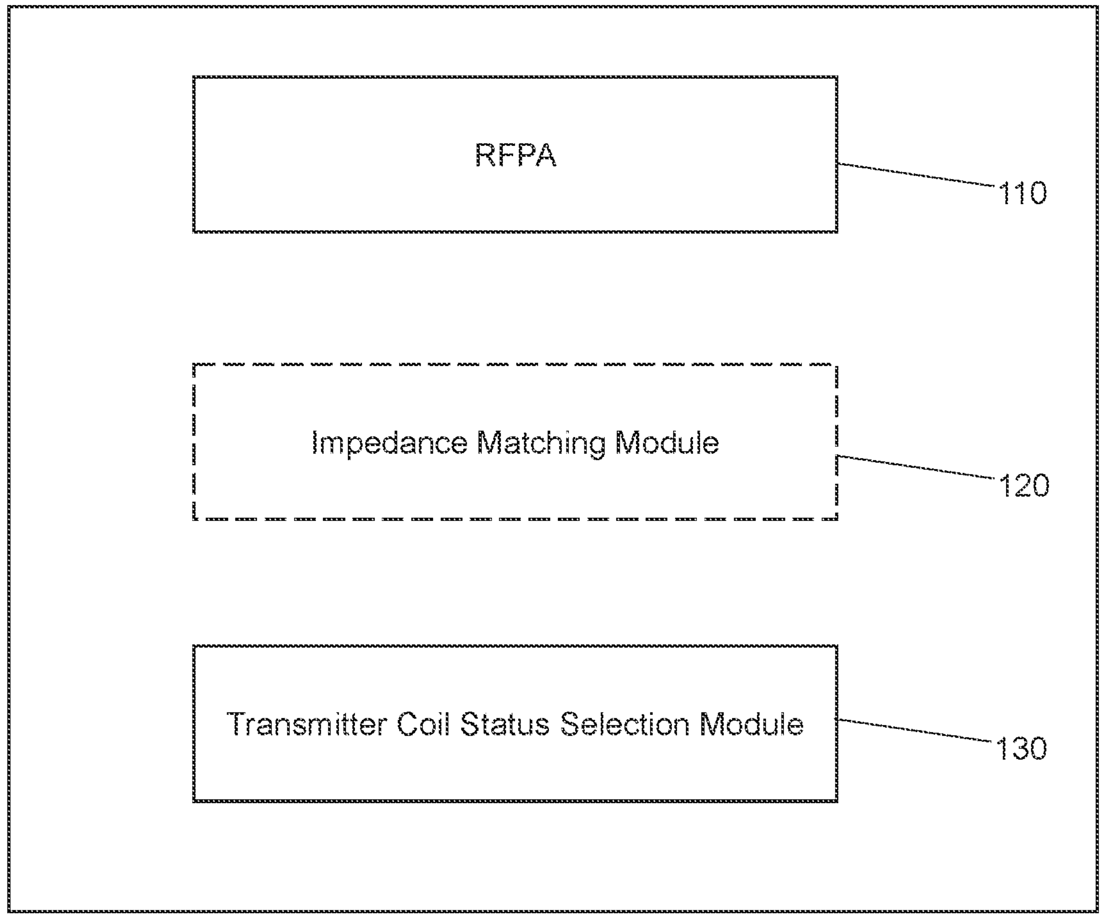
FIG. 1 is a block diagram illustrating an exemplary RF transmission device according to some embodiments of the present disclosure.

In the following detailed description, numerous specific details are set forth by way of examples in order to provide a thorough understanding of the relevant disclosure.

However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

As used herein, the term "and/or" includes any and all combinations of one or more of the associated listed items. In the present disclosure, unless otherwise expressly specified, the terms "connect," should be understood in a broad sense, for example, it may be a fixed connection, a detachable connection, integrated into a whole, a mechanical connection, an electrical connection, directly connected, or indirectly connected via an intermediate medium, an internal connection of two elements, or an interconnection of two elements. For those skilled in the art, the specific meanings of the above terms in the present disclosure may be understood according to specific circumstances. It is understood that when a component is referred to as being "integrated in" another component used herein, it may be directly on, connected or coupled to, or communicate with the another component, or an intervening component may be present, unless the context clearly indicates otherwise.

It will be understood that, although the terms "first," "second," "third," etc., may be used herein to distinguish one element from another. For example, a first element may be termed a second element, and similarly, a second element may be termed a first element, without departing from the scope of exemplary embodiments of the present disclosure.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

FIG. 1 is a block diagram illustrating an exemplary RF transmission device according to some embodiments of the present disclosure.

The RF transmission device 100 may include a radio frequency power amplifier (RFPA) 110 and a transmitter coil status selection module 130. The transmitter coil status selection module 130 (also known as transmitter status selection unit, TSSU) may be operably connected to the RFPA 110. The RFPA 110 may be configured to produce an RF signal (e.g., a high-power RF signal, a high-voltage RF signal). The transmitter coil status selection module 130 may be configured to transmit the RF signal to at least one of a plurality of RF coils. In some embodiments, the at least one RF coil may generate an RF magnetic field in response to a powerful current generated based on the RF signal. The RF magnetic field may be utilized to generate an MR signal related to a region of an object being imaged. In some embodiments, one of the plurality of RF coils may include a body coil, a local coil, a surface coil, etc.

In some embodiments, the transmitter coil status selection module 130 may include a plurality of switches operably connected to the plurality of RF coils. Each of the plurality of switches may be operably connected to one of the plurality of RF coils. The transmitter coil status selection module 130 may transmit the RF signal to the at least one of the plurality of RF coils by closing at least one of the plurality of switches corresponding to the at least one RF coil. In some embodiments, the transmitter coil status selection module 130 may include a sensor operably connected to the plurality of RF coils. The sensor may be configured to detect a power of the RF signal transmitted to the at least one RF coil.

In some embodiments, if an output impedance of the RFPA 110 fails to be substantially maintained at a predetermined level (e.g., 50Ω), a portion of the RF signal transmitted to the transmitter coil status selection module 130 and/or the at least one RF coil may reflect to the RFPA 110, thereby reducing the stability of the RF signal transmission and/or negatively affecting the electrical characteristics of at least one component of the RFPA 110, for example, the gain and/or the efficiency of a power circuit of the RFPA 110. In order to solve the problems, the RF transmission device 100 may also include an impedance matching module 120 configured to substantially maintain the output impedance of the RFPA 110 at the predetermined level. In some embodiments, the term "substantially" used herein indicates that the deviation (e.g., the deviation between the output impedance of the RFPA 110 and the predetermined level) is below a threshold, e.g., 2%, 5%, 8%, 10%, etc.

In some embodiments, the impedance matching module 120 may be operably connected to and in between the RFPA 110 and the transmitter coil status selection module 130. An output end of the RFPA 110 may be operably connected to an input end of the impedance matching module 120. An output end of the impedance matching module 120 may be operably connected to an input end of the transmitter coil status selection module 130. An output end of the transmission coil status selection module may be operably connected to the plurality of RF coil. The impedance matching module 120 may be configured to receive the RF signal from the RFPA 110 and transmit the RF signal to the transmitter coil status selection module 130. The transmitter coil status selection module 130 may further transmit the RF signal to the at least one of the plurality of RF coils.

In some embodiments, in order to substantially maintain the output impedance of the RFPA 110 at the predetermined level, an impedance (also known as equivalent impedance) produced by the impedance matching module 120 may match a load impedance of the RF transmission device 100. A sum of the load impedance of the RF transmission device 100 and the equivalent impedance produced by the impedance matching module 120 may be substantially equal to the predetermined level. The load impedance of the RF transmission device 100 may refer to an impedance (also known as equivalent impedance) produced by the transmitter coil status selection module 130 and the at least one of the plurality of RF coils. The term "substantially" used herein indicates that the deviation (e.g., the deviation between the predetermined level and the sum of the load impedance of the RF transmission device 100 and the equivalent impedance produced by the impedance matching module 120) is below a threshold, e.g., 2%, 5%, 8%, 10%, etc.

In some embodiments, the impedance matching module 120 may include an L matching network, a PI matching network, a T matching network, a multi-level matching network, or the like, or any combination thereof. The multi-level matching network may include a combination of the L matching network, the PI matching network, or the T matching network. For example, the multi-level matching network may include two L matching networks. As another example, the multi-level matching network may include an L matching network and a PI matching network. As a further example, the multi-level matching network may include an L matching network and two PI matching networks.

Figure 2:
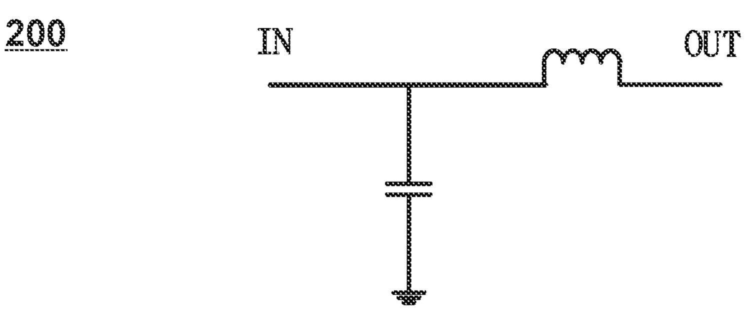
FIG. 2 is a schematic diagram illustrating an exemplary L matching network according to some embodiments of the present disclosure.

FIG. 2 is a schematic diagram illustrating an exemplary L matching network according to some embodiments of the present disclosure. As shown in FIG. 2, the L matching network 200 may include a capacitor and an inductor. The inductor may be operably connected to an input end and an output end of the L matching network 200, respectively. A first end of the capacitor may be located between the input end of the L matching network 200 and the inductor. A second end of the capacitor may be operably connected to ground.

Figure 3:
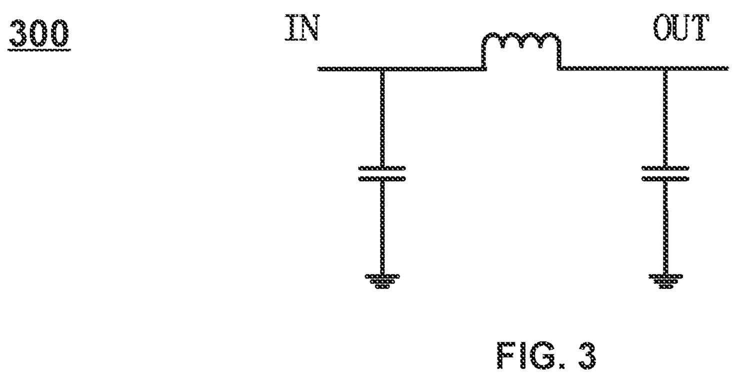
FIG. 3 is a schematic diagram illustrating an exemplary PI matching network according to some embodiments of the present disclosure.

FIG. 3 is a schematic diagram illustrating an exemplary PI matching network according to some embodiments of the present disclosure. As shown in FIG. 3, the PI matching network 300 may include an inductor and two capacitors. The inductor may be operably connected to an input end and an output end of the PI matching network 300, respectively. A first end of a capacitor may be operably connected to and in between the input end of the PI matching network 300 and the inductor, and a first end of another capacitor may be operably connected to and in between the output end of the PI matching network 300 and the inductor. A second end of the capacitor may be operably connected to ground, and a second end of the other capacitor may be operably connected to ground.

Figure 4:
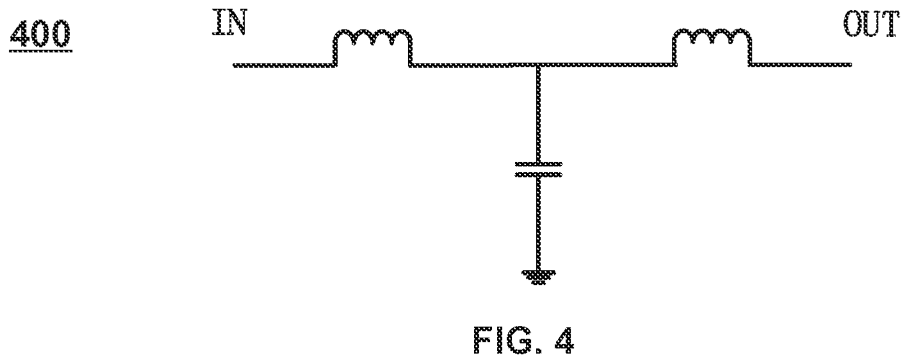
FIG. 4 is a schematic diagram illustrating an exemplary T matching network according to some embodiments of the present disclosure.

FIG. 4 is a schematic diagram illustrating an exemplary T matching network according to some embodiments of the present disclosure. As shown in FIG. 4, the T matching network 400 may include two inductors and a capacitor. The two inductors may be operably connected in series and operably connected to an input end and an output end of the T matching network 400, respectively. A first end of the capacitor may be operably connected to and in between the two inductors. A second end of the capacitor may be operably connected to ground.

In some embodiments, the load impedance of the RF transmission device 100 may change according to practical demands. For example, when the at least one of the plurality of RF coils is used to generate MR signals relating to different portions of the object or MR signals relating to different objects, the load impedance of the RF transmission device 100 may change. In order to substantially maintain the output impedance of the RFPA 110 at the predetermined level, the equivalent impedance produced by the impedance matching module 120 may need to be adjusted according to the changed load impedance of the RF transmission device 100.

In some embodiments, the impedance matching module 120 may include at least one inductor and/or at least one capacitor. The manner for adjusting the equivalent impedance produced by the impedance matching module 120 may include adjusting at least one capacitance of the at least one capacitor, at least one inductance of the at least one inductor, a count of the at least one inductor, a count of the at least capacitor, an arrangement of the at least one inductor and/or the at least one capacitor, or the like, or any combination thereof. In some embodiments, one of the at least one capacitor may include a vacuum capacitor, a variable capacitor, etc.

In some embodiments, the impedance matching module 120 may include at least one adjustment sub-module (also referred to as at least one first adjustment sub-module) configured to adjust the at least one capacitance of the at least one capacitor based on the load impedance of the RF transmission device 100. In some embodiments, one of the at least one capacitor may include metal plates. A first adjustment sub-module may adjust a distance between the metal plates inside the capacitor or the amount of plate surface area which overlaps, thereby adjusting the capacitance of the capacitor. In some embodiments, a rotatable rod may be operably connected to one of the at least one capacitor. A first adjustment sub-module may adjust the capacitance of the capacitor by rotating the rotatable rod. In some embodiments, one of the at least one first adjustment sub-module may include a controller, a controller circuit, or the like, or any combination thereof.

In some embodiments, a count of the at least one first adjustment sub-module may be equal to a count of the at least one capacitor, and each of the at least one first adjustment sub-module may be configured to adjust a capacitance of one of the at least one capacitor. In some embodiments, the count of the at least one first adjustment sub-module may be smaller than a count of the at least one capacitor, and each of the at least one first adjustment sub-module may be configured to adjust one or more capacitances of one or more capacitors of the at least one capacitor. For example, the at least one first adjustment sub-module may include a single adjustment sub-module configured to adjust the at least one capacitance of the at least one capacitor.

In some embodiments, the impedance matching module 120 may include at least one adjustment sub-module (also referred to as at least one second adjustment sub-module) configured to adjust the at least one inductance of the at least one inductor based on the load impedance of the RF transmission device 100. In some embodiments, one of the at least one inductor may include a ferrite core. A second adjustment sub-module may adjust an inductance of the inductor by adjusting a position of the ferrite core. For example, one of the at least one second adjustment sub-module may include a controller, a controller circuit, or the like, or any combination thereof.

In some embodiments, a count of the at least one second adjustment sub-module may be equal to a count of the at least one inductor, and each of the at least one second adjustment sub-module may be configured to adjust an inductance of one of the at least one inductor. In some embodiments, the count of the at least one second adjustment sub-module may be smaller than a count of the at least one inductor, and each of the at least one second adjustment sub-module may be configured to adjust one or more inductances of one or more inductors of the at least one inductor. For example, the at least one second adjustment sub-module may include a single adjustment sub-module configured to adjust the at least one inductance of the at least one inductor.

By arranging the at least one first adjustment sub-module and/or the at least one second adjustment sub-module, the equivalent impedance produced by the impedance matching module 120 may be adjusted by adjusting the at least one capacitance of the at least one capacitor and/or the at least one inductance of the at least one inductor, the circuit configuration of the impedance matching module 120 may remain the same, which may be easy to implement and suitable for various application scenarios.

In some embodiments, the impedance matching module 120 may include a first capacitor and a detuning sub-module. The detuning sub-module may include a second capacitor and an inductor. The second capacitor may be different from the first capacitor. The second capacitor may be in parallel connection with the inductor. A first end of the detuning sub-module may be operably connected to an output end of the RFPA 110. A second end of the detuning sub-module may be operably connected to the transmitter coil status selection module 130. The second end of the detuning sub-module may be different from the first end of the detuning sub-module. A first end of the first capacitor may be operably connected to and in between the output end of the RFPA 110 and the detuning sub-module. A second end of the first capacitor may be operably connected to ground. The second end of the first capacitor may be different from the first end of the first capacitor. In some embodiments, the second capacitor may be in series connection with the inductor. In some embodiments, the second capacitor may be in parallel connection with the inductor. In some embodiments, the impedance matching module 120 may also include an adjustment sub-module that is configured to adjust a capacitance of the first capacitor and/or a capacitance of the second capacitor, such that the equivalent impedance produced by the impedance matching module 120 matches the load impedance of the RF transmission device 100.

Figure 5:
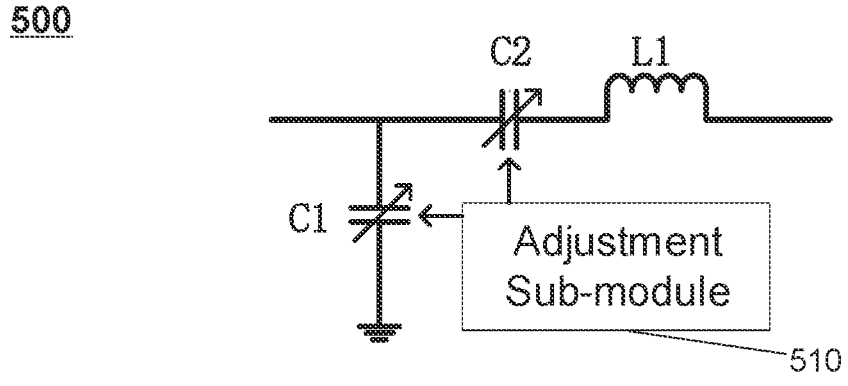
FIG. 5 is a schematic diagram illustrating an exemplary impedance matching module according to some embodiments of the present disclosure.

FIG. 5 is a schematic diagram illustrating an exemplary impedance matching module according to some embodiments of the present disclosure.

As shown in FIG. 5, the impedance matching module 500 may include a capacitor $C_1$, a capacitor $C_2$, an inductor $L_1$, and an adjustment sub-module 510. The capacitor $C_2$ and the inductor $L_1$ may be connected in series. A first end of the capacitor $C_2$ may be operably connected to an output end of the RFPA 110, and a second end of the capacitor $C_2$ may be operably connected to the inductor $L_1$. A first end of the inductor $L_1$ may be operably connected to the capacitor $C_2$, and a second end of the inductor $L_1$ may be operably connected to the transmitter coil status selection module 130. A first end of the capacitor $C_1$ may be operably connected to and in between the output end of the RFPA 110 and the capacitor $C_2$, and a second end of the capacitor $C_1$ may be operably connected to ground. The adjustment sub-module 510 may be operably connected to the capacitor $C_1$, and the capacitor $C_2$, respectively. The adjustment sub-module may be configured to adjust a capacitance of the capacitor $C_1$ and/or a capacitance of the capacitor $C_2$.

For example, assuming that the predetermined level is 50Ω, a frequency of the RF signal is 210 MHz, and the load impedance of the RF transmission device 100 is 35Ω, by adjusting the capacitance of the capacitor $C_2$ as 13.5 pF and the capacitance of the capacitor $C_1$ as 9.9 pF, the output impedance of the RFPA 110 may be 49.9Ω, which may be approximate to the predetermined level of 50 f.

As another example, assuming that the predetermined level is 50Ω, a frequency of the RF signal is 210 MHz, and the load impedance of the RF transmission device 100 is 20Ω, by adjusting the capacitance of the capacitor $C_2$ as 13.9 pF and the capacitance of the capacitor $C_1$ as 18.5 pF, the output impedance of the RFPA 110 may be 50.25Ω, which may be approximate to the predetermined level of 50Ω.

In some embodiments, each of the at least inductors and the at least one capacitor may have a switch. In some embodiments, the switch and the each of the at least inductors and the at least one capacitor may be in parallel connection. In some embodiments, the switch and the each of the at least inductors and the at least one capacitor may be in a series connection. The impedance matching module 120 may include a switch control sub-module configured to close or open at least one switch of the at least one inductor and the at least one capacitor based on the load impedance of the RF transmission device 100. In some embodiments, the switch may include a diode.

Figure 6:
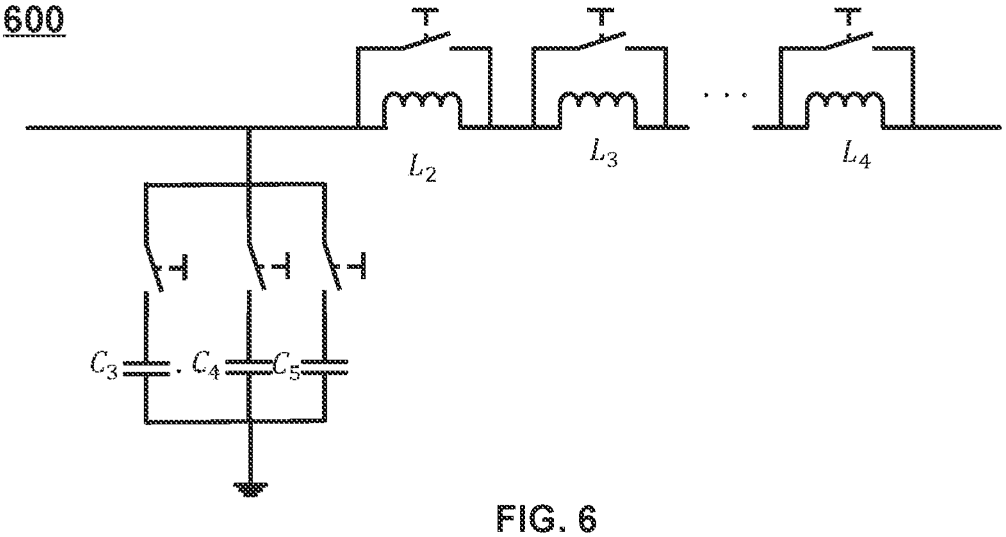
FIG. 6 is a schematic diagram illustrating an exemplary impedance matching module according to some embodiments of the present disclosure.
Figure 7:
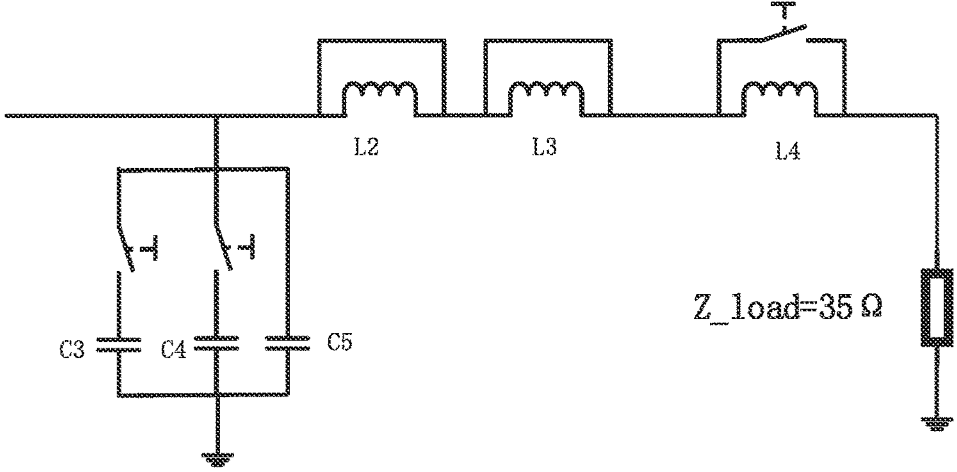
FIG. 7 is a schematic diagram illustrating an exemplary impedance matching module according to some embodiments of the present disclosure.
Figure 8:
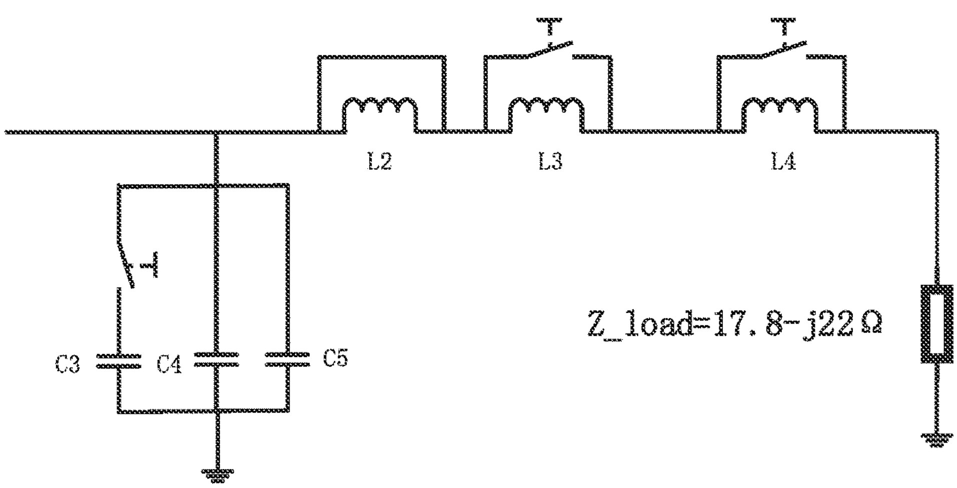
FIG. 8 is a schematic diagram illustrating an exemplary impedance matching module according to some embodiments of the present disclosure.

In some embodiments, a count of the switch control sub-module may be equal to a sum of the count of the at least one capacitor and the count of the at least one inductor, and each switch control sub-module may be configured to close or open one of the at least one switch of the at least one inductor and the at least one capacitor (e.g., as shown in FIGS. 6-8). In some embodiments, the count of the switch control sub-module may be smaller than the sum of the count of the at least one capacitor and the count of the at least one inductor, and each switch control sub-module may be configured to close or open one or more switches of the at least one switch of the at least one inductor and the at least one capacitor. For example, there may be a single switch control sub-module configured to close or open the at least one switch of the at least one inductor and the at least one capacitor.

By arranging the switch(es) and/or the switch control sub-module(s), the equivalent impedance produced by the at least one capacitor and the at least one inductor may be adjusted by adjusting a count of the at least one capacitor and/or a count of the at least one inductor. The circuit configuration of the impedance matching module 120 may remain the same, which may be easy to implement and suitable for various application scenarios.

FIG. 6 is a schematic diagram illustrating an exemplary impedance matching module according to some embodiments of the present disclosure. FIG. 7 is a schematic diagram illustrating an exemplary impedance matching module according to some embodiments of the present disclosure. FIG. 8 is a schematic diagram illustrating an exemplary impedance matching module according to some embodiments of the present disclosure.

As shown in FIGS. 6-8, the impedance matching module 600 may include a capacitor $C_3$, a capacitor $C_4$, a capacitor $C_5$, an inductor $L_2$, an inductor $L_3$, and an inductor $L_4$. The capacitor $C_3$, the capacitor $C_4$, and the capacitor $C_5$ may be operably connected in parallel. The inductor $L_2$, the inductor $L_3$, and the inductor $L_4$ may be operably connected in series. An inductance of each of the inductor $L_2$, the inductor $L_3$, and the inductor $L_4$ may be 28.4 nH. A capacitance of each of the capacitor $C_3$, the capacitor $C_4$, and the capacitor $C_5$ may be 16.6 pF. The capacitor $C_3$ may be operably connected to the output end of the RFPA 110. An end of the inductor $L_4$ may be operably connected to the transmitter coil status selection module 130. Each of the inductor $L_2$, the inductor $L_3$, and the inductor $L_4$ may have a switch in parallel connection. Each of the capacitor $C_3$, the capacitor $C_4$, the capacitor $C_5$ may have a switch in series connection.

Figure 9:
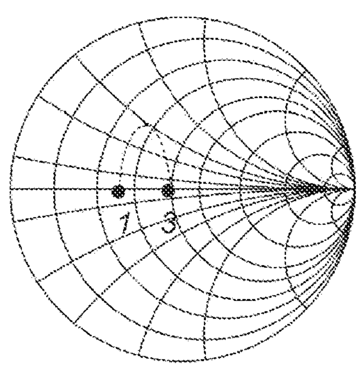
FIG. 9 is a Smith chart of a change of an output impedance of an RFPA according to some embodiments of the present disclosure.

For example, assuming that the predetermined level is 50Ω, a frequency of the RF signal is 210 MHz, and the load impedance of the RF transmission device 100 is 35Ω, By making one capacitor (e.g., the capacitor $C_5$ in FIG. 7) of the capacitor $C_3$, the capacitor $C_4$, and the capacitor $C_5$ and one inductor (e.g., the inductor $L_4$ in FIG. 7) conductive by closing a switch of the capacitor and opening a switch of the inductor, the output impedance of the RFPA 110 may be substantially the predetermined level of 50Ω. FIG. 9 is a Smith chart of a change of the output impedance of the RFPA 110 according to some embodiments of the present disclosure. As shown in FIG. 9, if the RFPA 110 is directly connected to the transmitter coil status selection module 130, the output impedance of the RFPA 110 may be 35Ω (i.e., an impedance of point 1 in FIG. 9); if the RFPA 110 is connected to the transmitter coil status selection module 130 through the impedance matching module 120 in FIG. 7, the output impedance of the RFPA 110 may be substantially the predetermined level of 50Ω (e.g., the impedance of point 3 in FIG. 9).

As another example, assuming that the predetermined level is 50Ω, a frequency of the RF signal is 210 MHz, and the load impedance of the RF transmission device 100 is (17.8−j22Ω), by making two capacitors (e.g., the capacitors $C_4$, $C_5$ in FIG. 8) of the capacitor $C_3$, the capacitor $C_4$, and the capacitor $C_5$ and two inductors (e.g., the inductors $L_3$, $L_4$ in FIG. 8) of the inductor $L_2$, the inductor $L_3$, and the inductor $L_4$ conductive by closing switches of the two capacitors and opening switches of the two inductors, the output impedance of the RFPA 110 may be substantially the predetermined level of 50 f.

Figure 10:
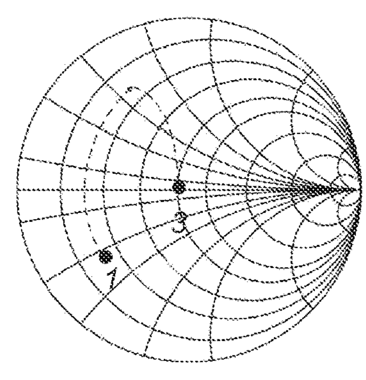
FIG. 10 is a Smith chart of a change of an output impedance of an RFPA according to some embodiments of the present disclosure.

FIG. 10 is a Smith chart of a change of the output impedance of the RFPA 110 according to some embodiments of the present disclosure. As shown in FIG. 10, if the RFPA 110 is directly connected to the transmitter coil status selection module 130, the output impedance of the RFPA 110 may be (17.8–j22Ω) (i.e., an impedance of point 1 in FIG. 10); if the RFPA 110 is connected to the transmitter coil status selection module 130 through the impedance matching module 120 in FIG. 8, the output impedance of the RFPA 110 may be substantially the predetermined level of 50Ω (e.g., the impedance of point 3 in FIG. 10).

It should be noted that the above descriptions are for illustration purposes and non-limiting. In some embodiments, the impedance matching module 120 may include at least one electronic component other than the capacitor(s) and the inductor(s). One of the at least one electronic component may include a resistor. The equivalent impedance produced by the impedance matching module 120 may be adjusted by adjusting a resistance of the resistor. In some embodiments, the impedance matching module 120 may include a first capacitor and a detuning sub-module. The detuning sub-module may include a second capacitor and a resistor. The second capacitor may be different from the first capacitor. A first end of the detuning sub-module may be operably connected to an output end of the RFPA 110. A second end of the detuning sub-module may be operably connected to the transmitter coil status selection module 130.

An existing RF transmission device may include the RFPA 110, the transmitter coil status selection module 130, and a circulator. The circulator, which is often integrated into the RFPA 110, may be used to stabilize the output impedance of the RFPA 110 at the predetermined level (e.g., 50Ω). However, the circulator may be usually made of a magnetic material and is conventionally unsuitable to be kept in an environment with a magnetic field. Some embodiments of the present disclosure may use the impedance matching module 120 to stabilize the output impedance of the RFPA 110 at the predetermined level instead of the circulator. Besides, the impedance matching module 120 may be non-magnetic, and the RF transmission device 100 in some embodiments of the present disclosure may be located in an environment with a magnetic field, merely affecting the function of the RF transmission device 100. In some embodiments, the magnetic field may include a static magnetic field (also referred to as a main magnetic field), a gradient field, a radio frequency (RF) field, or the like, or any combination thereof. More descriptions of the magnetic field may be found elsewhere in the present disclosure, for example, FIG. 13 and/or the descriptions thereof.

In some cases, the plurality of RF coils together with the transmitter coil status selection module 130 may be located in an environment with a magnetic field. Therefore, in order to avoid the negative effect of the magnetic field on the RFPA 110 integrated with the circulator of the existing RF transmission device, the RFPA 110 integrated with the circulator and the transmitter coil status selection module 130 of the existing RF transmission device may be housed in device containers positioned in difference rooms, resulting in waste of resources and space. Since the impedance matching module 120 may be non-magnetic, in some embodiments of the present disclosure, the RFPA 110 and the transmitter coil status selection module 130 may be housed in a device chamber. In some embodiments, the impedance matching module 120 may also be housed in the device chamber.

Figure 11:
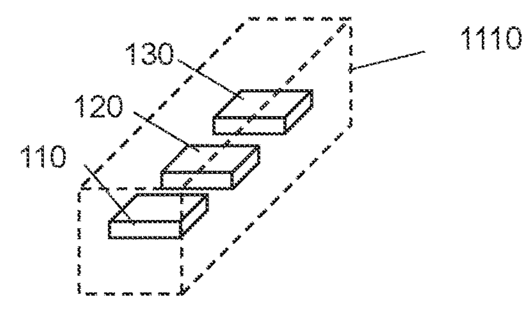
FIG. 11 is a schematic diagram illustrating an exemplary arrangement of an RF transmission device according to some embodiments of the present disclosure.

In some embodiments, the device chamber may be a shell of the RF transmission device 100, e.g., a device chamber 1110 in FIG. 11. In some embodiments, the device chamber may be a container or shell that can accommodate the entirety of the RF transmission device 100. In some embodiments, the device chamber is not a room.

Figure 12A:
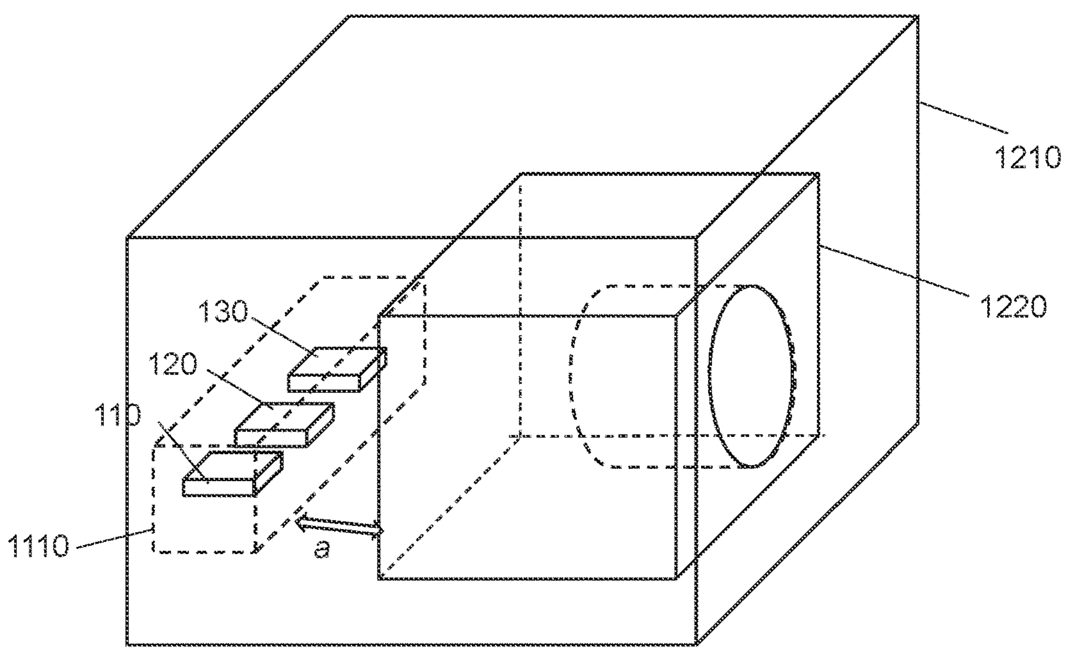
FIG. 12A is a schematic diagram illustrating an exemplary arrangement of an RF transmission device according to some embodiments of the present disclosure.

In some embodiments, the device chamber may be a room, e.g., a device chamber 1210 in FIG. 12A. In some embodiments, the RFPA 110, the transmitter coil status selection module 130, and the impedance matching module 120 may be integrated in a same portion of the room (e.g., as shown in FIG. 12A). In some embodiments, at least two of the RFPA 110, the transmitter coil status selection module 130, or the impedance matching module 120 may be integrated in different portions of the room. In some embodiments, the RF transmission device 100 may be integrated in the room as a whole (e.g., as shown in FIG. 12A). In some embodiments, the room may include a smaller room (also referred to as a scanning room) where a magnetic resonance imaging (MRI) scanner is located. In some embodiments, the RF transmission device 100 may be integrated in a portion of the scanning room other than a portion of the scanning room where the MRI scanner is located (e.g., as shown in FIG. 12A). The MRI scanner used herein may be configured to scan an object located within its detection region and generate imaging data relating to the object. In some embodiments, at least a portion of the RF transmission device 100 may be operably connected to the MRI scanner (e.g., as indicated by arrow a in FIG. 12A). For example, the RF transmission device 100 may suspend on a wall of the MRI scanner. In some embodiments, the plurality of the RF coils may be located in the room where the MRI scanner is located. The RF signal transmission between the RF transmission device 100 and the plurality of RF coils may be implemented in a same room without crossing a wall, simplifying the transmission chain for the RF signal and/or reducing the transmission loss of the RF signal.

Figure 12B:
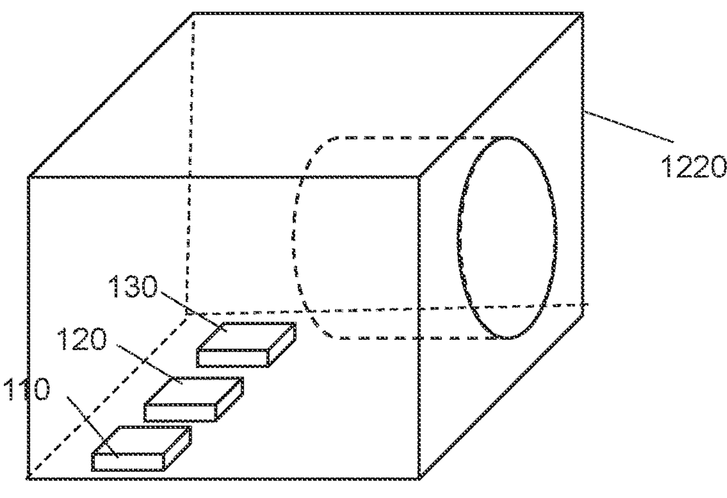
FIG. 12B is a schematic diagram illustrating an exemplary arrangement of an RF transmission device according to some embodiments of the present disclosure.

In some embodiments, the MRI scanner may include a gantry (e.g., a gantry 1220 in FIG. 12A or FIG. 12B) and a patient support. The patient support may be configured to support the object. The gantry may be configured to support a magnet, coils, etc. In some embodiments, the device chamber may be the gantry of the MRI scanner, e.g., the gantry 1220 in FIG. 12A or FIG. 12B. The RF transmission device 100 may be integrated in the gantry of the MRI scanner (or being part of the gantry). In some embodiments, the RFPA 110, the transmitter coil status selection module 130, and the impedance matching module 120 may be integrated in a same portion of the gantry of the MRI scanner. In some embodiments, at least two of the RFPA 110, the transmitter coil status selection module 130, or the impedance matching module 120 may be integrated in different portions of the gantry of the MRI scanner. In some embodiments, the RF transmission device 10 may be integrated in the gantry of the MRI scanner as a whole. In some embodiments, the plurality of RF coils may be integrated in the gantry of the MRI scanner. In some embodiments, the RF signal transmission between the RF transmission device 100 and the plurality of RF coils may be integrated in the gantry of the MRI scanner, simplifying the transmission chain for the RF signal and/or reducing the transmission loss of the RF signal. More descriptions of the MRI scanner may be found elsewhere in the present discourse, for example, FIG. 13 and/or the descriptions thereof.

There is no specific limitation as to the shape of the device chamber. In some embodiments, a cross-section of the device chamber may have the shape of a rectangle, a circle, an annulus, an arc, a trapezoid, a triangle, a rhombus, an irregular shape, etc.

In some embodiments, the impedance matching module 120 may include an interference reduction module housed in the device chamber. The interference reduction module may be configured to reduce electromagnetic interference between the RFPA and the transmitter coil status selection module. The electromagnetic interference may be reduced by using an electromagnetic shielding material, an active noise cancellation technique, etc.

Figure 13:
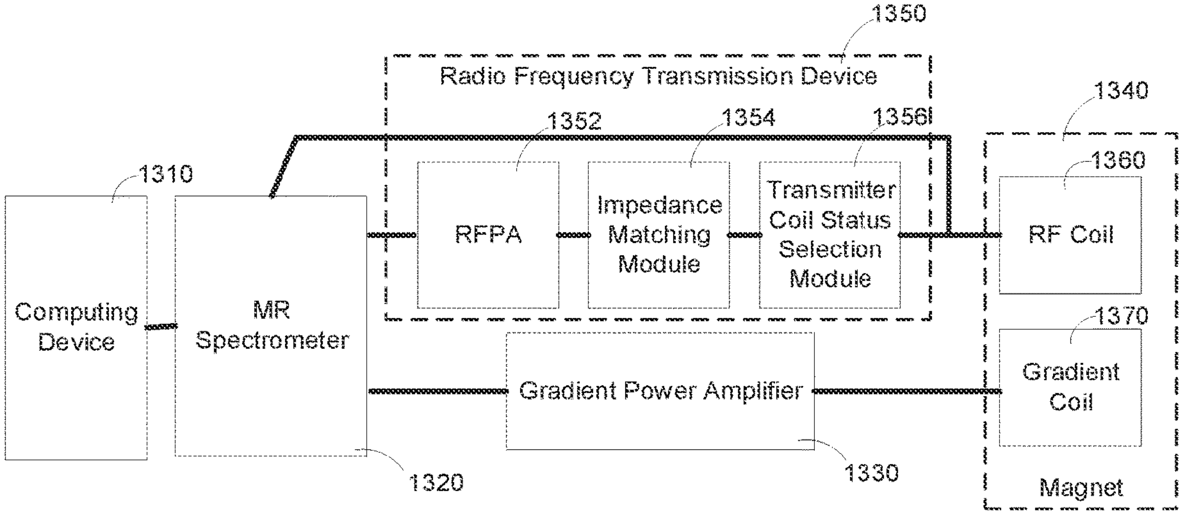
FIG. 13 is a block diagram illustrating an exemplary MR system according to some embodiments of the present disclosure.

FIG. 13 is a block diagram illustrating an exemplary MR system according to some embodiments of the present disclosure. As shown in FIG. 13, the MR system 1300 may include a computing device 1310, an MR spectrometer 1320, a gradient power amplifier 1330, a magnet 1340 (e.g., a main magnet), and an RF transmission device 1350. The computing device 1310 may be operably connected to the MR spectrometer 1320. The MR spectrometer 1320 may be operably connected to the RF transmission device 1350 and the gradient power amplifier 1330. The MR system 1300 may also include RF coils 1360 and gradient coils 1370 that are located inside the magnet 1340. In some embodiments, the MR spectrometer 1320, the gradient power amplifier 1330, the magnet 1340, the RF coils 1360, and/or the gradient coils 1370 may constitute at least a portion of an MRI scanner.

The magnet 1340 may generate a first magnetic field (or referred to as a main magnetic field) that may be applied to an object positioned inside the first magnetic field. The magnet 1340 may include a resistive magnet or a superconductive magnet that both need a power supply (not shown in FIG. 13) for operation. Alternatively, the magnet 1340 may include a permanent magnet. The magnet 1340 may also control the homogeneity of the generated main magnetic field. Some shim coils may be in the magnet 1340. The shim coils placed in the gap of the magnet 1340 may compensate for the inhomogeneity of the magnetic field of the magnet 1340. The shim coils may be energized by a shim power supply.

The gradient coils 1370 may be surrounded by the magnet 1340 and be closer to the object than the magnet 1340. The gradient coils 1370 may generate a second magnetic field (or referred to as a gradient field, including gradient fields Gx, Gy, and Gz). The second magnetic field may be superimposed on the main magnetic field generated by the magnet 1340 and distort the main magnetic field so that the magnetic orientations of the protons of the object may vary as a function of their positions inside the gradient field, thereby encoding spatial information into MR signals generated by the region of the object being imaged. The gradient coils 1370 may include X coils (e.g., configured to generate the gradient field Gx corresponding to the X-direction), Y coils (e.g., configured to generate the gradient field Gy corresponding to the Y-direction), and/or Z coils (e.g., configured to generate the gradient field Gz corresponding to the Z-direction) (not shown in FIG. 13). The X-direction, the Y-direction, and the Z-direction may be perpendicular to each other. The three sets of coils may generate three different magnetic fields that are used for position encoding. The gradient coils 1370 may allow spatial encoding of MR signals for image reconstruction. The gradient coils 1370 may be connected to the gradient power amplifier 1330 (e.g., an X gradient amplifier, a Y gradient amplifier, or a Z gradient amplifier). The gradient power amplifier 1330 may be connected to a waveform generator (not shown in FIG. 13). The waveform generator may generate gradient waveforms that are applied to the X gradient amplifier, the Y gradient amplifier, and/or the Z gradient amplifier. An amplifier may amplify a waveform. An amplified waveform may be applied to one of the coils in the gradient coils 1370 to generate the gradient fields Gx, Gy, and Gz, respectively. The gradient coils 1370 may be designed for either a close-bore MR scanner or an open-bore MRI scanner. In some instances, all three sets of coils of the gradient coils 1370 may be energized and three gradient fields may be generated thereby. In some embodiments, the X coils and Y coils may be energized to generate the gradient fields Gx and Gy.

In some embodiments, the RF coils 1360 may serve as transmitters, receivers, or both. The RF coils 1360 may be surrounded by the magnet 1340 and/or the gradient coils 1370 and be closer to the object than the gradient coils 1370.

When used as transmitters, the RF coils 1360 may generate RF signals that provide a third magnetic field that is utilized to generate MR signals related to the region of the object being imaged. The third magnetic field may be perpendicular to the main magnetic field. When used as receivers, the RF coils 1360 may be responsible for detecting MR signals (e.g., echoes). After excitation, the MR signals generated by the object may be sensed by the RF coils 1360. An amplifier may receive the sensed MR signals from the RF coils 1360, amplify the sensed MR signals, and provide the amplified MR signals to analog-to-digital converter (ADC) (not shown in FIG. 13). The ADC may transform the MR signals from analog signals to digital signals. The digital MR signals then may be sent to the computing device 1310 for sampling.

In some embodiments, the magnet 1340, the gradient coils 1370, and the RF coils 1360 may be circumferentially positioned with respect to the object. It is understood by those skilled in the art that the magnet 1340, the gradient coils 1370, and the RF coils 1360 may be situated in a variety of configurations around the object.

In some embodiments, the RF transmission device 1350 may include an RFPA 1352, an impedance matching module 1354, and a transmitter coil status selection module 1356. The RFPA 1352 may be configured to produce an RF signal. The impedance matching module 1354 may be configured to receive the RF signal from the RFPA 1352 and transmit the RF signal to the transmitter coil status selection module 1356. The transmitter coil status selection module 1356 may be configured to transmit the RF signal to at least one of a plurality of radio frequency coils.

In some embodiments, the RFPA 1352 and the transmitter coil status selection module 1356 may be housed in a device chamber. In some embodiments, the impedance matching module 1354 may also be housed in the device chamber. The RF transmission device 1350 may be the same as or similar to the RF transmission device 100, more descriptions of which are not repeated herein.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be operably connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A radio frequency transmission device, comprising:

a radio frequency power amplifier (RFPA) configured to produce a radio frequency signal;

a transmitter coil status selection module configured to transmit the radio frequency signal to at least one of a plurality of radio frequency coils, wherein the RFPA and the transmitter coil status selection module are housed in a device chamber; and an impedance matching module connected to and in between the RFPA and the transmitter coil status selection module, wherein the impedance matching module is configured to receive the radio frequency signal from the RFPA and transmit the radio frequency signal to the transmitter coil status selection module, wherein the impedance matching module includes at least one capacitor, at least one inductor, and at least one switch control sub-module, each of the at least one inductor and the at least one capacitor has a switch, the at least one switch control sub-module is configured to close or open at least one switch of the at least one inductor and the at least one capacitor, and a count of the at least one switch control sub-module is smaller than a sum of a count of the at least one capacitor and a count of the at least one inductor, wherein the impedance matching module includes the at least one capacitor and a detuning sub-module including a second capacitor and second inductor;

a first end of the detuning sub-module is operably connected to an output end of the RFPA:

a second end of the detuning sub-module is operably connected to the transmitter coil status selection module;

a first end of the at least one capacitor is operably connected to and in between the output end of the RFPA and the detuning sub-module;

a second end of the at least one capacitor is operably connected to ground, wherein the impedance matching module further includes an adjustment sub-module operably connected to the detuning sub-module and the first capacitor; and the adjustment sub-module is configured to adjust at least one of a capacitance of the at least one capacitor or a capacitance of the second capacitor based on the load impedance of the radio frequency transmission device.

2. The radio frequency transmission device of claim 1, wherein the impedance matching module is housed in the device chamber.

3. The radio frequency transmission device of claim 1, wherein the impedance matching module includes an L matching network, a PI matching network, a T matching network, or a multi-level matching network.

4. The radio frequency transmission device of claim 3, wherein the impedance matching module includes the multi-level matching network, and the multi-level matching network includes two L matching networks, an L matching network and a PI matching network, or an L matching network and two PI matching networks.

5. The radio frequency transmission device of claim 1, wherein an equivalent impedance produced by the at least one inductor and the at least one capacitor matches a load impedance of the radio frequency transmission device.

6. The radio frequency transmission device of claim 5, wherein the at least one adjustment sub-module is further configured to adjust at least one inductance of the at least one inductor based on the load impedance of the radio frequency transmission device, one of the at least one inductor includes a ferrite core, and the at least one adjustment sub-module adjusts an inductance of the inductor by adjusting a position of the ferrite core.

7. The radio frequency transmission device of claim 1, wherein one of the at least one capacitor includes a vacuum capacitor or a variable diode.

8. The radio frequency transmission device of claim 1, wherein the switch includes a diode.

9. The radio frequency transmission device of claim 1, wherein the transmitter coil status selection module includes a plurality of switches operably connected to the plurality of coils;

the transmitter coil status selection module transmits the radio frequency signal to the at least one of the plurality of radio frequency coils by closing at least one of the plurality of switches corresponding to the at least one radio frequency coil.

10. The radio frequency transmission device of claim 1, further comprising an interference reduction module housed in the device chamber, wherein the interference reduction module is configured to reduce electromagnetic interference between the RFPA and the transmitter coil status selection module.

11. The radio frequency transmission device of claim 1, wherein the radio frequency transmission device is located in an environment with a magnetic field.

12. The radio frequency transmission device of claim 11, wherein the magnetic field includes at least one of a static magnetic field, a gradient field, or a radio frequency field.

13. The radio frequency transmission device of claim 1, wherein an equivalent impedance produced by the at least one inductor and the at least one capacitor matches a load impedance of the radio frequency transmission device.

14. The radio frequency transmission device of claim 1, wherein the impedance matching module includes a third capacitor, a fourth capacitor, a fifth capacitor, a second inductor, a third inductor, and a fourth inductor, the third capacitor, the fourth capacitor, and the fifth capacitor are operably connected in parallel, the second inductor, the third inductor, and the fourth inductor are operably connected in series, the third capacitor is operably connected to an output end of the RFPA, an end of the fourth inductor is operably connected to the transmitter coil status selection module, each of the second inductor, the third inductor, and the fourth inductor has a switch in parallel connection, and each of the third capacitor, the fourth capacitor, and the fifth capacitor has a switch in series connection.

15. The radio frequency transmission device of claim 1, wherein the impedance matching module further includes the at least one adjustment sub-module; and the at least one adjustment sub-module is configured to adjust at least one capacitance of the at least one capacitor based on a load impedance of the radio frequency transmission device.

16. A radio frequency transmission device, comprising a radio frequency power amplifier (RFPA), an impedance matching module, and a transmitter coil status selection module, wherein:

the RFPA is configured to produce a radio frequency signal;

the impedance matching module is configured to receive the radio frequency signal from the RFPA and transmit the radio frequency signal to the transmitter coil status selection module; and the transmitter coil status selection module is configured to transmit the radio frequency signal to at least one of a plurality of radio frequency coils, wherein the RFPA, the impedance matching module, and the transmitter coil status selection module are housed in a room, and wherein impedance matching module includes at least one capacitor, at least one inductor, and at least one switch control sub-module, each of the at least one inductor and the at least one capacitor has a switch, the at least one switch control sub-module is configured to close or open at least one switch of the at least one inductor and the at least one capacitor, and a count of the at least one switch control sub-module is smaller than a sum of a count of the at least one capacitor and a count of the at least one inductor, wherein the impedance matching module includes the at least one capacitor and a detuning sub-module including a second capacitor and second inductor;

a first end of the detuning sub-module is operably connected to an output end of the RFPA;

a second end of the detuning sub-module is operably connected to the transmitter coil status selection module:

a first end of the at least one capacitor is operably connected to and in between the output end of the RFPA and the detuning sub-module;

a second end of the at least one capacitor is operably connected to ground, wherein the impedance matching module further includes an adjustment sub-module operably connected to the detuning sub-module and the first capacitor; and the adjustment sub-module is configured to adjust at least one of a capacitance of the at least one capacitor or a capacitance of the second capacitor based on the load impedance of the radio frequency transmission device.

17. A magnetic resonance (MR) system, comprising:

a computing device, a magnetic resonance spectrometer, a gradient power amplifier, a magnet, and a radio frequency transmission device, wherein the computing device is operably connected to the magnetic resonance spectrometer; and the magnetic resonance spectrometer is operably connected to the radio frequency transmission device and the gradient power amplifier, wherein the radio frequency transmission device includes:

a radio frequency power amplifier (RFPA) configured to produce a radio frequency signal; a transmitter coil status selection module configured to transmit the radio frequency signal to at least one of a plurality of radio frequency coils, wherein the RFPA and the transmitter coil status selection module are housed in a device chamber; and an impedance matching module connected to and in between the RFPA and the transmitter coil status selection module, wherein the impedance matching module is configured to receive the radio frequency signal from the RFPA and transmit the radio frequency signal to the transmitter coil status selection module, wherein the impedance matching module includes at least one capacitor, at least one inductor, and at least one switch control sub-module, each of the at least one inductor and the at least one capacitor has a switch, the at least one switch control sub-module is configured to close or open at least one switch of the at least one inductor and the at least one capacitor, and a count of the at least one switch control sub-module is smaller than a sum of a count of the at least one capacitor and a count of the at least-one inductor, wherein the impedance matching module includes the at least one capacitor, a second capacitor, the at least one inductor, and at least one adjustment sub-module, the second capacitor and the at least one inductor are connected in series, a first end of the second capacitor is operably connected to an output end of the RFPA, and a second end of the second capacitor is operably connected to the at least one inductor;

a first end of the at least one inductor is operably connected to the second capacitor, and a second end of the at least one inductor is operably connected to the transmitter coil status selection module, a first end of the at least one capacitor is operably connected to and in between the output end of the RFPA and the second capacitor, and a second end of the at least one capacitor is operably connected to ground, and the at least one adjustment sub-module is operably connected to the at least one capacitor, and the second capacitor, respectively, and is configured to adjust a capacitance of the at least one capacitor and/or a capacitance of the second capacitor.

* * * * *